United States Patent Office 3,389,138
Patented June 18, 1968

3,389,138
PHENYL-ALPHA-PIPERAZINO-ALKANOATES
Angelo Larizza and Giovanni Brancaccio, Naples, Italy, assignors to Richardson-Merrell S.p.A., Naples, Italy, a corporation of Italy
No Drawing. Filed Apr. 13, 1965, Ser. No. 447,909
Claims priority, application Great Britain, May 21, 1964, 21,073/64
12 Claims. (Cl. 260—268)

ABSTRACT OF THE DISCLOSURE

Novel compounds of the formula

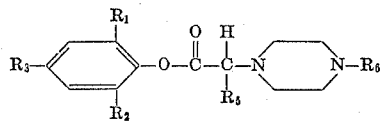

wherein: $R_3$ is hydrogen or (lower) alkyl; $R_1$ and $R_2$ are (lower) alkyl, lower alkoxy or halogen; $R_5$ is hydrogen, (lower) alkyl, phenyl or alkylphenyl; and $R_6$ is (lower) alkyl, (lower) hydroxyalkyl or benzyl; and non-toxic acid addition salts thereof. These compounds have utility as local anesthetics. The compounds are prepared by reacting an alpha-halo-alkanoyl chloride with a phenol and reacting the resulting alpha-halo-ester with a piperazine.

---

This invention relates to novel ortho, ortho-disubstituted phenol esters of N,N-disubstituted alpha-amino acids and their non-toxic acid addition salts. These phenol esters have utility as local anesthetics.

The novel phenol esters of this invention are piperazino derivatives which can be represented by the general formula:

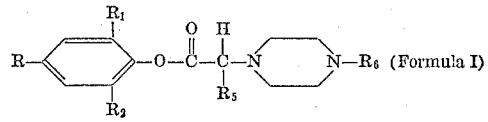 (Formula I)

wherein: each of $R_1$ and $R_2$ is alkyl, alkoxy or halogen; $R_6$ is (lower) alkyl, (lower) hydroxyalkyl or benzyl; R is hydrogen or alkyl; and $R_5$ is hydrogen, alkyl or carbocyclic aryl having 6 to 9 carbon atoms. The symbols R, $R_1$, $R_2$, $R_6$ and $R_5$ are consistently used herein to indicate the substituents in, or intended for, the positions in the molecule illustrated in Formula I above. The preferred alkyls of the above symbols are (lower) alkyls, i.e. an alkyl having from 1 to about 6 carbon atoms, and particularly (lower alkyls having from 1 to 3 carbon atoms. The preferred 2,6-substituents ($R_1$ and $R_2$) are iso-propyl groups. The term (lower) as used herein to describe an alkyl, or portion thereof, e.g. (lower) alkylol or (lower) alkoxy, refers to such a group having from 1 to about 6 carbon atoms.

Illustrative of (lower) alkyls there can be mentioned: methyl, ethyl, propyl, iso-propyl, butyl, iso-butyl, tertiary butyl, pentyl, and the like. The preferred alkoxy groups are (lower) alkoxy groups. Illustrative of (lower) alkoxy there can be mentioned: methoxy, ethoxy, propoxy, iso-propoxy, butoxy, and the like. Illustrative of halogen there can be mentioned: chlorine, bromine, iodine and fluorine. The aryls as can be represented by $R_5$ are preferably phenyl or alkphenyl having from 6 to 9 carbon atoms, e.g. 4-methylphenyl, 2-5 dimethylphenyl, 3-ethylphenyl, 4-iso-propylphenyl, and the like.

Illustrative of (lower) hydroxyalkyls there can be mentioned those having one or more hydroxyl groups, e.g. 3 hydroxyl groups. However, the (lower) alkylols are preferred. Illustrative of hydroxyalkyls which can be represented by $R_6$ in the above generic Formula I, there can be mentioned: 2-hydroxyethyl, 3-hydroxypropyl, 4-hydroxybutyl, 3-hydroxybutyl, 1,1-di(hydroxymethyl)-methyl, and the like. As in the case of other (lower) alkyl groups in the novel compounds of the invention, the (lower) hydroxyalkyls have from 1 to 6 carbon atoms. Additionally, preferred compounds are those in which: (a) R is hydrogen and each of $R_1$, $R_2$, $R_5$ and $R_6$ is (lower) alkyl; (b) R is hydrogen, $R_5$ is phenyl, and each of $R_1$, $R_2$, and $R_6$ is (lower) alkyl; or (c) R is hydrogen, $R_5$ is phenyl, and $R_6$ is (lower) alkylol.

The principal basis for the various preferred substituents is that of local anesthetic activity. Illustratively it has been found that the more active compounds of this invention are particularly those wherein: the alpha carbon atom of the acid to which the second nitrogen atom is attached is also substituted by (lower) alkyl or phenyl, R is hydrogen, and $R_1$ and $R_2$ are (lower) alkyl, and particularly iso-propyl.

The non-toxic acid addition salts of the phenol ester derivatives are prepared by conventional techniques. Illustrative of suitable acids for the preparation of the acid addition salts there can be mentioned various acids such as hydrochloric, sulfuric, citric, acetic, malic, maleic and phosphoric. The mono- or dihydrochloride salts are preferred.

The novel compounds of this invention have been found therapeutically useful, having remarkable long lasting local anesthetic activity, which is surprising as unsubstituted phenol esters are not active, being easily hydrolysed both in vivo and in vitro. These novel compounds can be employed as local anesthetics in much the same manner as lidocaine. It seems that the high local anesthetic activity of the new compounds of the invention may be due to the steric hindrance of the substituents interfering with, and for practical purposes preventing, hydrolysis. V. Hach and others have described in Collection Czechoslov. Chem. Commun., 1957, 22, 1887, the local anesthetic properties of a compound of the Formula I illustrated above in which R, $R_1$ and $R_2$ are methyl groups, $R_3$ and $R_4$ are ethyl groups, and $R_5$ is a hydrogen atom. The Hach compound differs structurally from those claimed herein. Also many of the compounds of this invention are much more active as local anesthetics.

This invention also includes a process of preparing the new compounds and their intermediates, by the following reaction scheme:

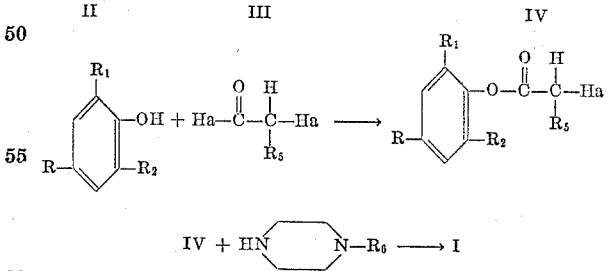

wherein Ha represents a halogen atom.

The process of the invention comprises condensing an ortho, ortho-disubstituted phenol with an alpha-halogeno carboxylic acid halide in the presence of a base, and condensing the resulting alpha-halo-acyl ester with a secondary amine.

The appropriate ortho, ortho-disubstituted phenol II reacts without external heating (and with careful control of the temperature) in benzene (but other non-polar solvents may alternatively be used) with the alpha-halogeno carboxylic acid halide III in the presence of a base, such as pyridine (but other organic or inorganic bases may alternatively be used). Equimolar quantities of the reagents may be used, the base only in a slight excess to neutralize the hydrogen halide formed. From the reaction mixture the precipitated pyridine halide may be filtered off and the benzene solution washed with sodium hydroxide solution and water to neutrality, and dried over anhydrous sodium sulphate. After evaporation of the solvent, the residue may be distilled under reduced pressure. Table A gives the yields and boiling points of the intermediates IV thus obtained.

over a wide range, e.g. 8 to 15 hours at about 80° C.–115° C. Preferably, the molar ratio of the ester to the amine is about 1:2 and the reaction mixture is heated for about 12 hours at 100° C. or under reflux to effect high yields of the condensation reaction. After reaction, the crude product is preferably cooled, filtered from the hydrochloride or hydrobromide of the secondary amine and extracted with a dilute acid. After making the acid extract alkaline, the reaction product is extracted with a solvent (e.g. diethyl ether, chloroform, benzene or other non-

TABLE A.—INTERMEDIATES IV

| R | $R_1$ | $R_2$ | $R_5$ | Ha | Yield, percent | Formula | Boiling point, ° C./mm. Hg |
|---|---|---|---|---|---|---|---|
| H | $CH_3$ | $CH_3$ | H | Cl | 90 | $C_{10}H_{11}ClO_2$ | 132/15 |
| H | $CH_3$ | $CH_3$ | $CH_3$ | Br | 78 | $C_{11}H_{13}BrO_2$ | 97–100/0.4 |
| H | $CH_3$ | $CH_3$ | $C_2H_5$ | Br | 63 | $C_{12}H_{15}BrO_2$ | 115/1 |
| H | $CH_3$ | $CH_3$ | $C_6H_5$ | Br | 62 | $C_{16}H_{15}BrO_2$ | 145–150/0.001 |
| H | $C_2H_5$ | $C_2H_5$ | H | Cl | 80 | $C_{12}H_{15}ClO_2$ | 135–140/15 |
| H | $C_2H_5$ | $C_2H_5$ | $CH_3$ | Br | 93 | $C_{13}H_{17}BrO_2$ | 90–95/0.001 |
| H | $C_2H_5$ | $C_2H_5$ | $C_2H_5$ | Br | 52 | $C_{14}H_{19}BrO_2$ | 95–100/0.001 |
| H | iso-$C_3H_7$ | iso-$C_3H_7$ | $C_2H_5$ | Br | 50 | $C_{16}H_{23}BrO_2$ | 100–104/0.001 |
| H | $CH_3O$— | $CH_3O$— | H | Cl | 85 | $C_{10}H_{11}ClO_4$ | 120–122/0.001 |
| H | $CH_3O$— | $CH_3O$— | $CH_3$ | Br | 85 | $C_{11}H_{13}BrO_4$ | 125–130/0.001 |
| H | $CH_3O$— | $CH_3O$— | $C_2H_5$ | Br | 75 | $C_{12}H_{15}BrO_4$ | 130–135/0.01 |
| H | $CH_3$ | Cl | H | Cl | 80 | $C_9H_8Cl_2O_2$ | 95–100/0.001 |
| H | $CH_3$ | Cl | $CH_3$ | Br | 75 | $C_{10}H_{10}BrClO_2$ | 100–102/0.01 |
| H | $CH_3$ | Cl | $C_2H_5$ | Br | 25 | $C_{11}H_{12}BrClO_2$ | 103–106/0.001 |
| $CH_3$ | $CH_3$ | $CH_3$ | $CH_3$ | Br | 84 | $C_{12}H_{15}BrO_2$ | 96–102/0.001 |
| $CH_3$ | $CH_3$ | $CH_3$ | $C_2H_5$ | Br | 28 | $C_{13}H_{17}BrO_2$ | 95–100/0.001 |
| H | iso-$C_3H_7$ | iso-$C_3H_7$ | $CH_3$ | Br | 75 | $C_{15}H_{21}BrO_2$ | 100–104/0.001 |
| H | iso-$C_3H_7$ | iso-$C_3H_7$ | H | Cl | 97 | $C_{14}H_{19}ClO_2$ | 140–145/15 |

The condensation of the intermediates IV (alpha-haloacyl-esters of ortho, ortho-disubstituted phenols) with the secondary cyclic amines may be carried out with or without solvents which may be hydrocarbons such as benzene. The molar ratio of the ester: amine in the reaction mixture can vary over a wide range such as that of from about 0.5:2 and 2:1 moles of ester per mole of amine. Also the reaction time and reaction temperature can vary water miscible solvents), the solvent is evaporated and the residue is distilled under reduced pressure. The yields, physical properties and elementary analysis of the Formula I compounds are given in Table B together with the reference numbers by which the new compounds will hereinafter be known, the figures for the free bases being given above those for their respective hydrochloride or dihydrochloride as appears from the formula given.

TABLE B

| Compound | R | $R_1$ | $R_2$ | $R_5$ | $-N\underset{\phantom{x}}{\phantom{x}}N-R_6$ | Formula | Yield, Percent | B.P., ° C./mm. Hg | $n_D°$ | M.P., ° C. |
|---|---|---|---|---|---|---|---|---|---|---|
| FC410 | H | $CH_3$ | $CH_3$ | H | $-N\phantom{x}N-CH_3$ | $\{C_{15}H_{22}N_2O_2 \atop C_{15}H_{24}Cl_2N_2O_2\}$ | 81 | 128–131/0.001 | | 41–42 *225–227 |
| FC464 | H | $CH_3$ | $CH_3$ | $CH_3$ | $-N\phantom{x}N-CH_3$ | $\{C_{16}H_{24}N_2O_2 \atop C_{16}H_{26}Cl_2N_2O_2\}$ | 77 | 132/0.2 | $1.5141^{23}$ | 186–187 |
| FC480 | H | $CH_3$ | $CH_3$ | $C_2H_5$ | $-N\phantom{x}N-CH_3$ | $\{C_{17}H_{26}N_2O_2 \atop C_{17}H_{28}Cl_2N_2O_2\}$ | 56 | 138–140/0.001 | $1.5115^{27}$ | |
| FC 586 | H | $CH_3$ | $CH_3$ | (phenyl) | $-N\phantom{x}N-CH_3$ | $C_{21}H_{27}ClN_2O_2$ | 75 | | | 210–211 |
| FC591 | H | $CH_3$ | $CH_3$ | (phenyl) | $-N\phantom{x}N-CH_2-CH_2-OH$ | $C_{22}H_{30}Cl_2N_2O_2$ | 73 | | | 240–242 |
| FC641 | H | $C_2H_5$ | $C_2H_5$ | H | $-N\phantom{x}N-CH_3$ | $\{C_{17}H_{26}N_2O_2 \atop C_{17}H_{28}Cl_2N_2O_2\}$ | 80 | 125–130/0.001 | $1.5095^{30}$ | 210–211 |
| FC643 | H | $C_2H_5$ | $C_2H_5$ | $CH_3$ | $-N\phantom{x}N-CH_3$ | $\{C_{18}H_{28}N_2O_2 \atop C_{18}H_{30}Cl_2N_2O_2\}$ | 81 | 130/0.001 | $1.5152^{15}$ | 228–230 |
| FC651 | H | $C_2H_5$ | $C_2H_5$ | $C_2H_5$ | $-N\phantom{x}N-CH_3$ | $C_{19}H_{30}N_2O_2$ | 80 | 140/0.001 | $1.5054^{31}$ | 200–202 |
| FC631 | H | iso-$C_3H_7$ | iso-$C_3H_7$ | H | $-N\phantom{x}N-CH_3$ | $\{C_{19}H_{30}N_2O_2 \atop C_{19}H_{32}Cl_2N_2O_2\}$ | 70 | 125/0.001 | | 46–48 224–226 |
| FC646 | H | iso-$C_3H_7$ | iso-$C_3H_7$ | $CH_3$ | $-N\phantom{x}N-CH_3$ | $\{C_{20}H_{32}N_2O_2 \atop C_{20}H_{34}Cl_2N_2O_2\}$ | 97 | 140–145/0.001 | $1.5036^{31}$ | 202–204 |
| FC669 | H | iso-$C_3H_7$ | iso-$C_3H_7$ | $CH_3$ | $-N\phantom{x}N-CH_2C_6H_5$ | $\{C_{26}H_{36}N_2O_2 \atop C_{26}H_{38}Cl_2N_2O_2\}$ | 91 | 180–185/0.001 | $1.5362^{20}$ | 237–239 |

*Dec.

TABLE B—Continued

| Compound | R | R₁ | R₂ | R₅ | —N⟨⟩N—R₆ | Formula | Yield, Percent | B.P., °C./mm. Hg | n_D° | M.P. °C. |
|---|---|---|---|---|---|---|---|---|---|---|
| FC653 | H | CH₃O | CH₃O | H | —N⟨⟩N—CH₃ | {C₁₅H₂₂N₂O₄ / C₁₅H₂₄Cl₂N₂O₄} | 30 | 140/0.001 | 1.5273²² | 205–207 |
| FC654 | H | CH₃O | CH₃O | CH₃ | —N⟨⟩N—CH₃ | {C₁₆H₂₄N₂O₄ / C₁₆H₂₆Cl₂N₂O₄} | 55 | 140–145/0.001 | ---- | 78–80 / 196–198 |
| FC665 | H | CH₃O | CH₃O | C₂H₅ | —N⟨⟩N—CH₃ | {C₁₇H₂₆N₂O₄ / C₁₇H₂₈Cl₂N₂O₄} | 34 | 144–150/0.001 | ---- | 68–70 / 222–224 |
| FC666 | H | CH₃ | Cl | H | —N⟨⟩N—CH₃ | {C₁₄H₁₉ClN₂O₂ / C₁₄H₂₁Cl₃N₂O₂} | 48 | 115–120/0.001 | 1.5237²³ | 208–210 |
| FC668 | H | CH₃ | Cl | CH₃ | —N⟨⟩N—CH₃ | {C₁₅H₂₁ClN₂O₂ / C₁₅H₂₃Cl₃N₂O₂} | 60 | 135–140/0.001 | 1.5242²² | 207–209 |
| FC658 | CH₃ | CH₃ | CH₃ | H | —N⟨⟩N—CH₃ | {C₁₆H₂₄N₂O₂ / C₁₆H₂₆Cl₂N₂O₂} | 84 | ---- | ---- | 58–60 / 238–240 |
| FC661 | CH₃ | CH₃ | CH₃ | CH₃ | —N⟨⟩N—CH₃ | {C₁₇H₂₆N₂O₂ / C₁₇H₂₈Cl₂N₂O₂} | 77 | 140–145/0.001 | 1.5159¹⁸ | 218–220 |
| FC681 | CH₃ | CH₃ | CH₃ | C₂H₅ | —N⟨⟩N—CH₃ | {C₁₈H₂₈N₂O₂ / C₁₈H₃₀Cl₂N₂O₂} | 41 | 144–148/0.001 | 1.5160¹⁶ | 194–196 |

| Compound | Elementary Analysis, Percent | | | | | | | |
|---|---|---|---|---|---|---|---|---|
| | C | | H | | N | | Cl | |
| | Calc. | Found | Calc. | Found | Calc. | Found | Calc. | Found |
| FC665 | 63.33 | 63.44 | 8.13 | 8.09 | 8.69 | 8.88 | 17.94 | 17.65 |
| FC666 | 59.45 | 59.52 | 6.77 | 6.98 | ---- | ---- | 12.54 / 29.90 | 12.82 / 29.52 |
| FC668 | 46.47 | 46.59 | 6.50 | 6.41 | ---- | ---- | 11.93 / 27.44 | 11.65 / 27.33 |
| FC658 | 69.53 | 69.60 | 8.75 | 8.65 | 10.14 | 10.25 | 20.84 | 20.45 |
| FC661 | 70.31 | 70.62 | 9.02 | 9.05 | 9.65 | 9.88 | 19.52 | 19.43 |
| FC681 | {71.01 / 54.96} | {70.83 / 54.35} | {9.27 / 7.66} | {9.26 / 7.92} | 9.20 | 9.44 | 17.93 | 17.58 |

TABLE C

This table shows acute toxicity and anesthetic activity (nervous conductivity block) of the compounds of this invention in comparison with lidocaine, as standard, at the same concentration. A plus sign (+) for anesthetic activity means that anesthesia continued for over twenty four (24) hours.

| Compound | LD₅₀ mg./kg. Subcutaneous | Anesthetic activity |
|---|---|---|
| FC586 | 110 | + |
| FC591 | 65 | + |
| FC646 | 600 | + |
| FC480 | (Endovenous 42) 170 | 6.5 |
| FC464 | (Endovenous 20) 185 | 2.8 |
| FC455 | (Endovenous 21) 230 | 2.3 |
| FC631 | (Endovenous 11) 2,000 | 2.2 |
| FC666 | 240 | 2.1 |
| FC643 | 300 | 2 |
| FC668 | 180 | 2 |
| FC651 | 540 | 2 |
| FC661 | 270 | 1.9 |
| FC641 | 1,550 | 1.8 |
| FC410 | 500 | 1.8 |
| FC658 | (Endovenous 22) 320 | 1.6 |
| FC654 | 1,675 | 1.3 |
| Lidocaine | 400 | 1 |
| FC665 | (Endovenous 25–34) 1,500 | 1 |
| FC681 | | 0.9 |
| FC669 | | 0.8 |

TABLE D

This table shows local anesthetic (corneal anesthesia) activity of three of the novel compounds of the invention at different concentrations, in comparison with lidocaine as the standard.

| Compound No. | Concentration, percent | |
|---|---|---|
| | 1 | 0.5 |
| Lidocaine | 1 | 1 |
| FC480 | 4.9 | 9.3 |
| FC464 | 3.5 | 4.4 |
| FC646 | | 8.8 |

EXAMPLE 1

Preparation of 2,6 - dimethyl-phenyl-alpha-phenyl-alpha-(N-methyl-piperazino)-acetate hydrochloride (FC586 and hydrochloride)

A mixture of 31.9 g. 2,6-dimethyl-phenyl-alpha-phenyl-alpha-bromo-acetate and 20 g. of N-methyl-piperazine is heated at 100° C. for 12 hours. The cooled mixture is mixed with 250 ml. of benzene and filtered. The clear benzene solution is shaken with normal hydrochloric acid. The separated acid solution is made alkaline with potassium carbonate powder and extracted with diethyl ether. From the organic solution the solvent is removed and the residue is distilled at 160–162° C. at 0.001 mm. Hg. Yield: 28.2 g. or 83.5% of the theoretical. The distilled substance is dissolved in 200 ml. of diethyl ether and to this solution 86 ml. of normal ethanolic hydrochloric acid solution is added. The precipitate thus formed is collected by filtration and dried. Yield: 26.4 g. or 90% of the theoretical.

EXAMPLE 2

Preparation of 2,6 - dimethyl-phenyl-alpha-phenyl-alpha-(N-beta-hydroxyl-ethyl-piperazino) - acetate hydrochloride (FC591 and hydrochloride)

16 g. of 2,6 - dimethyl - phenyl - alpha-phenyl-alpha-bromo-acetate and 13 g. of N-beta-hydroxy-ethyl-piperazine are mixed and the mixture is heated at 100° C. for 12 hours. After cooling, 200 ml. of benzene is added and the suspension, transferred into a separating funnel, is shaken first with water and then with hydrochloric acid. The acid solution is made alkaline with solid potassium carbonate and extracted with diethyl ether. To the ethereal solution, after drying over anhydrous sodium sulphate, is added 120 ml. of ethanolic hydrochloric acid solution. The separated solid is filtered and crystallised from ethanol diethyl ether mixture. Yield: 16.2 g. or 73% of the theoretical.

EXAMPLE 3

Preparation of 2,6-dimethyl-phenyl-alpha-(N-methyl-piperazino)-propionate (FC464)

A mixture of 63 g. 2,6-dimethyl-phenyl-alpha-bromo-propionate and 50 g. of N-methylpiperazine is heated at 100° C. for 12 hours. After adding 500 ml. of benzene, the mixture is filtered and the clear filtrate is extracted with normal hydrochloric acid. The acid extracts combined are made alkaline with potassium carbonate powder and then shaken with diethyl ether. The ether solution, after drying over anhydrous sodium sulphate, is evaporated and the residue, thus obtained, is distilled at 132° C. at 0.2 mm. Hg. Yield: 54 g. (77% of the theoretical).

EXAMPLE 4

Preparation of 2,6-di-isopropyl-phenyl-alpha-(N-methyl-piperazino)-propionate di-hydrochloride (FC646 di-hydrochloride)

33.2 g. of FC646 is dissolved in 200 ml. of diethyl ether, and to this solution 150 ml. of 2 N ethanolic hydrochloric acid solution is added. The precipitate which forms is filtered off and crystallised from ethanol. Melting point 200–2° C. Yield: 37 g. or 92% of the theoretical.

EXAMPLE 5

2,6-dimethoxy-phenyl-alpha-(N-methyl-piperazino)-butyrate (FC665)

15 g. of 2,6-dimethoxy-phenyl-alpha-bromo-butyrate and 10 g. of methyl-piperazine are stirred together and heated at 100° C. for 12 hours. After cooling the reaction mixture is taken up in 100 ml. of benzene and the suspension is filtered from the insoluble N-methyl-piperazine hydrobromide formed during the reaction. The clear solution is extracted with 2 N hydrochloric acid. The acid extract is separated, made alkaline and extracted with diethyl ether. The solvent is evaporated from the ether extract and the residue is distilled at 140–150° C. at 0.001 mm. Hg. Yield: 5.5 g. or 34% of the theoretical.

EXAMPLE 6

Preparation of 1% injectable solution of FC480

Two (2) g. of FC480 is suspended in 150 ml. of distilled water and mixed with 6.9 ml. of normal hydrochloric acid solution. The compound goes into solution and the pH is adjusted to 5.5. To this solution are added 1.2 g. of sodium chloride, 0.1 g. of sodium pyrosulphite, 0.2 g. of sodium nipagine (registered trademark for sodium para-methoxy-benzoate), and distilled water to 200 ml. Ampoules are filled with this solution and sterilized at 105° C. for 45 minutes.

EXAMPLE 7

Preparation of injectable solution containing 0.25% of FC480

0.5 g. of FC480 is suspended in 150 ml. of distilled water and dissolved by addition of 1.73 ml. of normal hydrochloric acid solution. To this solution are added 1.2 g. of sodium chloride, 0.1 g. of sodium pyrosulphite, 0.2 g. of sodium nipagine, and distilled water to 200 ml. Ampoules are filled with this solution and sterilized at 105° C. for 45 minutes.

EXAMPLE 8

Preparation of injectable solution containing 0.25% of FC480 with epinephrine 0.5 g. of FC480 prepared s in Example 15 is suspended in 150 ml. of distilled water and dissolved by addition of 1.73 ml. of normal hydrochloric acid solution. To this solution are added 2 ml. of epinephrine hydrochloride (1% water solution), 1.2 g. of sodium chloride, 0.1 g. of sodium pyrosulphite, 0.2 g. of sodium nipagine, and distilled water to 200 ml. Ampoules are filled with this solution and sterilized at 105° C. for 45 minutes.

EXAMPLE 9

Preparation of injectable solution containing 1% of FC646

2 g. of FC646 is suspended in 150 ml. of distilled water and dissolved by addition of 6.1 ml. of normal hydrochloric acid solution. The pH is adjusted to 5.5. To this solution are added 1.2 g. of sodium, 0.1 g. of sodium pyrosulphite, 0.2 g. of sodium nipagine and water to 200 ml. The filtered solution is packed into ampoules and sterilized at 105° C. for 45 minutes.

EXAMPLE 10

Preparation of injectable solution containing 0.25% of FC646 and epinephrine 0.5 g. of FC646 prepared as in Example 17 is suspended in 150 ml. of distilled water and dissolved by addition of 1.52 ml. of normal hydrochloric acid solution. The pH is adjusted to 5.5. To this solution are added 1.2 g. of sodium chloride, 0.1 g. of sodium pyrosulphite, 0.2 g. of sodium nipagine, 2 ml. of epinephrine hydrochloride 1% solution, and water to 200 ml. The filtered solution is packed into ampoules and sterilized at 105° C. for 45 minutes.

EXAMPLE 11

Injectable solution containing 1% of FC480 as its acetate 2 g. of FC480 prepared as in Example 15 is suspended in 150 ml. of distilled water and dissolved by addition of 0.44 g. of acetic acid. The pH is adjusted to 5.5. To this solution are added 1.7 g. of sodium acetate, 0.1 g. of sodium pyrosulphite, 0.2 g. of sodium nipagine and distilled water to 200 ml. Ampoules are filled with this solution and sterilized at 105° C. for 45 minutes.

EXAMPLE 12

Preparation of injectable solution containing 1% of FC480 as its maleate 2 g. of FC480 prepared as in Example 15 is suspended in 150 ml. of distilled water and dissolved by addition of 0.8 g. maleic acid. The pH is adjusted to 5.5. To this solution are added 3.3 g. of sodium pyrosulphite, 0.2 g. of sodium nipagine and distilled water to 200 ml. Ampoules are filled with this solution and sterilized at 105° C. for 45 minutes.

EXAMPLE 13

Preparation of injectable solution containing 1% of FC480 as its succinate 2 g. of FC480 prepared as in Example 17 is suspended in 150 ml. of distilled water and dissolved by addition of 0.84 g. of succinic acid. The pH is adjusted to 5.5. To this solution are added 3.3 g. of sodium succinate, 0.1 g. of sodium pyrosulphite, 0.2 g. of sodium nipagine and distilled water to 200 ml. Ampoules are filled with this solution and sterilized at 105° C. for 45 minutes.

The acute toxicity values shown in Table C hereinbefore for compounds of this invention were obtained by administering hydrochloride salts of the respective free base compounds to mice. The $LD_{50}$ was calculated according to Arch. Ex. Path. Pharmakol, 177, 379 (1935). The anesthetic activities from which the values for Table C were obtained, were by the use of water soluble salts of the compounds involved as tested in vivo in male rats according to the method of A. P. Truant, Arch. Intern. Pharmacodyn, 115, 483 (1958). The corneal anesthetic activities used for calculating the values in Table D were obtained by administering salts of the various compounds to rabbits.

EXAMPLE 14

Preparation of 2,6 - di - isopropyl - phenyl-ester of alpha-bromo - propionic acid (intermediate IV: R=H; $R_1=R_2$=iso-$C_3H_7$; $R_5=CH_3$; HA=Br)

To a benzene solution (100 ml.) of 18 g. of 2,6-di-isopropyl-phenol and 8 g. of pyridine is added at room temperature 21.6 g. of alpha-bromo-propionyl-chloride, previously dissolved in 50 ml. of benzene. Immediately the reaction mixture is filtered, and the clear benzene solution is washed with sodium bicarbonate solution, and water to neutral. After drying over sodium sulphate anhydrous, the solvent is evaporated, and the residue is distilled at 100–4° C. (0.001 mm. Hg). Yield: 23.2 g. or 75% of the theory.

EXAMPLE 15

Preparation of 2,6 - dimethyl - phenyl - alpha-(N-methyl-piperazino)-butyrate (FC480)

A mixture of 2,6-dimethyl-phenyl-alpha-bromo-butyrate (55 g.) and N-methyl-piperazino (40 g.) is stirred and heated at 100° C. for 12 hours. After cooling 500 ml. of benzene is added and the suspension is filtered to separate the insoluble N-methyl-piperazino hydrobromide formed during the reaction. From the clear benzene filtrate the active compound is extracted several times with normal hydrochloric acid for a total of 500 ml. The separated acid extracts are added with potassium carbonate powder until alkaline reaction, and extracted with ethyl ether. The ether extracts are dried over sodium sulphate anhydrous and the solvent is evaporated. The residue is distilled at 138–40° C. (0.001 mm. Hg). Yield: 33 g. or 56% of the theory.

EXAMPLE 16

Preparation of 2,6 - dimethyl - phenyl - alpha-(N-methyl-piperazino)-butyrate di-hydrochloride (FC480 di-hydrochloride)

29 g. of FC480, as obtained in the above Example 15, is dissolved in 150 ml. of ethyl ether, and to this solution 110 ml. of ethanolic hydrochloric acid 2 N solution is added. The precipitate thus formed is filtered and crystallized from ethanol. Yield: 32 g. or 88% of the theory.

EXAMPLE 17

Preparation of 2,6-di-isopropyl-phenyl-alpha-(N-methyl-piperazino)-propionate (FC646)

A mixture of 31.3 g. of 2,6-di-isopropyl-phenyl-alpha-bromo-propionate and 20 g. of N-methyl-piperazine is heated and stirred at 100° C. for 12 hours. After cooling the reaction mixture is treated with 250 ml. of benzene and filtered. The clear benzene solution is extracted with normal hydrochloric acid. The separated acid solution is alkalized with potassium carbonate powder and extracted with ether. From the organic solution the solvent is evaporated. The residue is distilled at 140–5° C. at 0.001 mm. Hg. Yield: 32.5 g. or 98% of the theory.

Following much the same procedures as those of the above examples other compounds of this invention can be be preparaed such as those shown in Table B herein or the following additional compounds:

2,6-dimethyl-phenyl-alpha-ethyl-alpha-(N-beta-hydroxy-ethyl-piperazino)-acetate;
2,4,6-trimethoxy-phenyl-alpha-(4-methyphenyl)-alpha-(N-3-hydroxy-propyl-piperazino)-acetate;
2,4,6-trimethyl-phenyl-alpha-methyl-alpha-(N-beta-hydroxy-ethyl-piperazino)-acetate; and
2,4,6-trimethyl-phenyl-alpha-phenyl-alpha-(N-benzyl-piperazino)-acetate.

Pharmaceutical compositions can contain one or more of the new compounds of this invention as an active agent in a therapeutically acceptable solid or liquid, carrier or diluent which may be in dosage unit form, such as ampoules, sprays, ointments, pastes. As carriers, for example water, buffers, glycerol, and poly-ethylene-glycol are suitable. Owing to the water insolubility of the new compounds of the invention, which are generally oily high boiling liquids, or crystalline solids, they may be used in the form of a non-toxic acid addition salt such as the hydrochloride, sulphate or tartrate which may be prepared in a manner well known in itself. The composition of the invention can include other active principles, which can have a synergic effect such as adrenaline. The addition of tensio-active or detergent agents improve the activity of the compounds of the invention owing to their sparing water and dilute mineral-acid solubility. Lyophilic solvents such as vegetable or animal oils, fats such as Vaseline, or cholesterol may be used.

The compounds of this invention when administered to humans for local anesthesia, are preferably dissolved in water as their hydrochlorides (or other salts with organic or inorganic acids) at concentrations between about 2% and 0.25% depending on the anesthesia time desired. The volume of the administered solution can be from about 10 ml. to 0.1 ml., depending on the anatomic region and the surface intended to be anesthetized.

What is claimed is:

1. A phenol ester derivative selected from the group consisting of a compound of the formula:

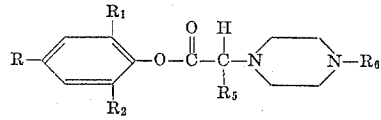

wherein R is a member selected from the group consisting of hydrogen and alkyl of 1 to 6 carbon atoms; each of $R_1$ and $R_2$ is a member selected from the group consisting of alkyl of 1 to 6 carbon atoms, alkoxy of 1 to 6 carbon atoms and halogen; $R_5$ is a member selected from the group consisting of hydrogen, alkyl of 1 to 6 carbon atoms, and a phenyl or alkylphenyl having from 1 to 3 carbon atoms in the alkyl group; and $R_6$ is a member selected from the group consisting of alkyl of 1 to 6 carbon atoms, hydroxyalkyl of 1 to 6 carbon atoms and benzyl; and a non-toxic acid addition salt of said phenol ester derivative.

2. A phenol ester derivative of claim 1, wherein R is hydrogen and each of $R_1$, $R_2$, $R_5$ and $R_6$ is alkyl of 1 to 6 carbon atoms.

3. A compound of claim 2 wherein each alkyl has from 1–3 carbon atoms.

4. A phenol ester derivative of claim 1, wherein R is hydrogen and each of $R_1$, $R_2$ and $R_6$ is alkyl of 1 to 6 carbon atoms and $R_5$ is phenyl.

5. A phenol ester derivative of claim 1, wherein each of $R_1$, $R_2$ and $R_6$ is alkyl having 1–3 carbon atoms.

6. A phenol ester derivative of claim 1, wherein R is hydrogen, $R_5$ is phenyl, $R_6$ is alkylol having 1 to 6 carbon atoms and each of $R_1$ and $R_2$ is alkyl of 1 to 6 carbon atoms.

7. A phenol ester derivative of claim 6, wherein each of $R_1$ and $R_2$ is alkyl having from 1–3 carbon atoms and $R_6$ is alkylol having from 1–3 carbon atoms.

8. A phenol ester derivative selected from the group consisting of 2,6-dimethyl-phenyl-alpha-phenyl-alpha-(N-methyl-piperazino)-acetate and a non-toxic acid addition salt thereof.

9. A phenol ester derivative selected from the group consisting of 2,6 - dimethyl - phenyl - alpha - phenyl - alpha-(N-beta-hydroxy-ethyl-piperazino)-acetate and a non-toxic acid addition salt thereof.

10. A phenol ester derivative selected from the group consisting of 2,6 - diisopropyl - phenyl - alpha - (N - methyl-piperazino)-acetate and a non-toxic acid addition salt thereof.

11. A phenol ester derivative selected from the group consisting of 2,6 - dimethyl - phenyl - alpha - (N - methyl-piperazino)-propionate and a non-toxic acid addition salt thereof.

12. A phenol ester derivative selected from the group consisting of 2,6 - dimethyl - phenyl - alpha - (N - methyl-piperazino)-butyrate and a non-toxic acid addition salt thereof.

References Cited

UNITED STATES PATENTS 624,772    5/1899    Einhorn _____ 260—479

OTHER REFERENCES

Bothe, Horst et al.: Chemical Abstracts, vol. 53, page 298b (1959).

NICHOLAS S. RIZZO, *Primary Examiner.*

JOSE TOVAR, *Assistant Examiner.*